United States Patent [19]

LaTondress et al.

[11] Patent Number: 5,005,706
[45] Date of Patent: Apr. 9, 1991

[54] STABLE ROLL TRANSPORT BUNDLE

[75] Inventors: Nancy T. LaTondress, Mt. Juliet; H. E. Thomas, Hendersonville, both of Tenn.

[73] Assignee: Reemay, Inc., Old Hickory, Tenn.

[21] Appl. No.: 442,664

[22] Filed: Nov. 29, 1989

Related U.S. Application Data

[63] Continuation-in-part of Ser. No. 281,104, Dec. 7, 1988, Pat. No. 4,898,761.

[51] Int. Cl.⁵ .................... B65D 85/20; B65D 85/62; B65D 85/67
[52] U.S. Cl. .................................... 206/595; 206/391; 206/394; 206/443; 206/598
[58] Field of Search ............... 206/391, 394, 443, 595, 206/598

[56] References Cited

U.S. PATENT DOCUMENTS

| | | | |
|---|---|---|---|
| 1,477,818 | 12/1923 | Gerlat | 206/443 |
| 2,774,490 | 12/1956 | Strong | 206/598 |
| 3,051,307 | 8/1962 | Hoey et al. | 206/394 |
| 3,220,583 | 11/1965 | Robertson | 206/443 |
| 3,227,272 | 1/1966 | Critzer | 206/394 |
| 3,283,893 | 11/1966 | Durocher et al. | 206/443 |
| 3,606,054 | 9/1971 | Miller | 206/391 |
| 4,033,455 | 7/1977 | Robison | 206/391 |
| 4,036,418 | 7/1977 | Chlebda | 206/391 |
| 4,058,216 | 11/1977 | Tsuyuguchi | 206/391 |
| 4,386,704 | 6/1983 | Maillat | 206/391 |
| 4,565,289 | 6/1986 | Lesueur | 206/443 |
| 4,643,307 | 2/1987 | Wilkinson | 206/443 |
| 4,890,743 | 1/1990 | Powell et al. | 206/595 |
| 4,898,761 | 2/1990 | Dunaway et al. | 428/137 |

FOREIGN PATENT DOCUMENTS

| | | | |
|---|---|---|---|
| 2208139 | 8/1973 | Fed. Rep. of Germany | 206/443 |
| 253982 | 2/1988 | German Democratic Rep. | 206/443 |
| 721360 | 3/1980 | U.S.S.R. | 206/443 |
| 727158 | 3/1955 | United Kingdom | 206/391 |

Primary Examiner—James C. Cannon
Attorney, Agent, or Firm—Juettner Pyle & Lloyd

[57] ABSTRACT

Transportation package comprising at least three adjacent polls of wound sheet material in tangential contact with each other about a centrally located hollow tube capable of accommodating an insertable lifting means.

6 Claims, 2 Drawing Sheets

STABLE ROLL TRANSPORT BUNDLE

CROSS REFERENCE

This is a continuation-in-part of application Ser. No. 281,104, filed Dec. 7, 1988, now U.S. Pat. No. 4,898,761.

BACKGROUND OF THE INVENTION

This invention relates to packaging and more particularly to bundle configurations for a plurality of rolls, which are stable and may be conveniently transported.

Lengths of sheet material such as natural and synthetic fabrics or films are wound onto a cylindrical core. The diameter of the roll may be limited by practical considerations, such as a total length and weight which can be handled conveniently by the end user. Thus, it is often necessary for a manufacturer or packager to assemble and transport a large number of small diameter rolls to a wholesale or retail outlet. While large numbers of rolls may be tied or strapped together in a stable bundle, the resulting bundle may become heavy and difficult to transport.

SUMMARY OF THE INVENTION

In accordance with the present invention, a plurality of rolls of fabric, film, or similar material in sheet form, is provided. The rolls are arranged around a hollow central core in a stable geometrical configuration. Of the configurations available, a single layer of rolls may be disposed around a central hollow core or tube of a defined diameter, with the rolls being in tangential contact with adjacent others and with the core. If a plurality of sets or layers of rolls are employed, the innermost layer consists of three or six rolls in a stable geometric relationship as defined above.

After the rolls are assembled as described above, they are tied or strapped together in a secure bundle. The bundle may be moved conveniently from one location to another by inserting a pole or a tine of a forklift truck into the hollow central tube and lifting. When the bundle is moved in such a fashion, the package is balanced because the rolls are uniformly and evenly disposed around the central core.

THE DRAWINGS

DESCRIPTION OF THE PREFERRED EMBODIMENTS

FIGS. 3, 4, 5 and 6 illustrate various single layer bundles in which three, four, five and six wound rolls 10 of fabric, film or other sheet material are provided around a central core 12. In order to simplify bundling, the rolls are preferably equal in length and diameter. It may be seen that adjacent rolls are in tangential contact along their lengths with each other, and each of the rolls are in tangential contact with the central support tube or core 12. It may be seen that if a single layer of rolls 10 is employed, any number may be arranged around a core of suitable diameter.

The geometrical relation between the rolls and the central core is set forth below:

$$D_c = D_r \left( \frac{1}{\sin\left(\frac{\pi}{N}\right) - 1} \right)$$

$D_c$ = the outside diameter of the central support core;
$D_r$ = the outside diameter of the individual rolls.
$N$ = the number of sides desired for the package.

The central hollow core 12 in the form of a tube or cylinder may be constructed of any durable material such as fiberboard. The individual rolls 10 comprise a central core having multiple layers of flexible thin sheet material wound thereon, such as woven and nonwoven fabrics, films, and the like.

For most applications, it will be desirable to bundle more than one layer of relatively small rolls around a central core. In such an event, it has been found that the innermost layer of rolls must consist of either three or six rolls. Otherwise, adjacent rolls of successive layers will not be in tangential contact with each other or will not all be in contact with the adjacent inner layer.

Figure 2:
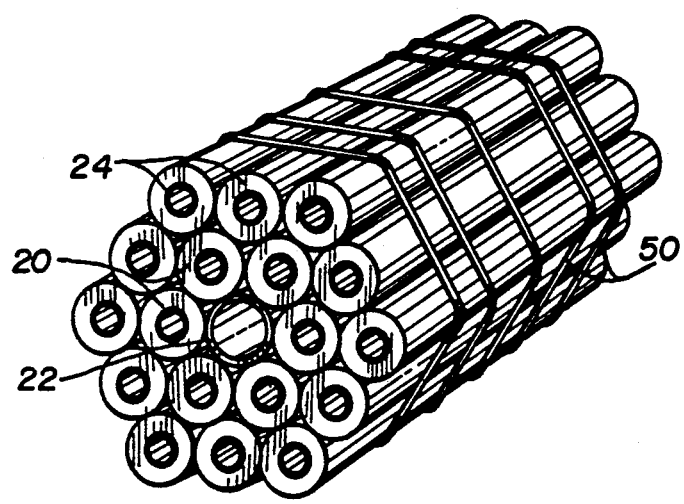
FIG. 2 is a view similar to FIG. 1 illustrating a completed roll bundle.
Figure 3:
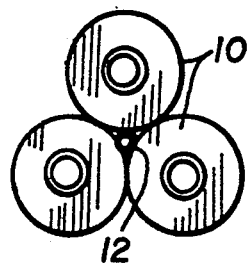
FIGS. 3, 4, 5 and 6 are schematic end views of various numbers of rolls disposed in a single layer around a central core.
Figure 4:
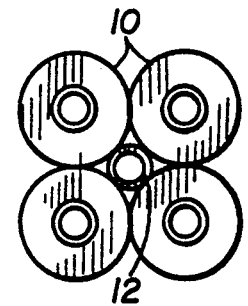
Figure 5:
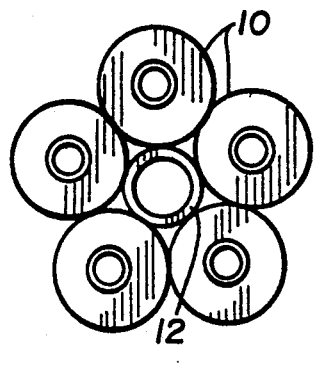
Figure 6:
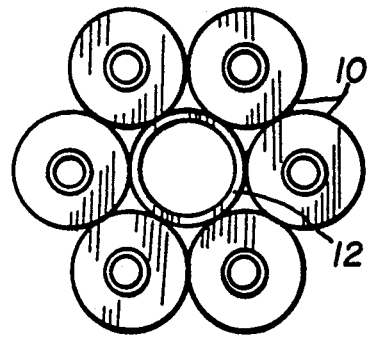

FIG. 2 illustrates a completed bundle based on an innermost layer of six rolls 20 disposed around a central core 22. A second layer of twelve rolls 24 is disposed around the first layer in a nesting, stable configuration. it may be seen that a third layer of eighteen rolls could be added, followed by a fourth layer of twenty four.

Figure 1:
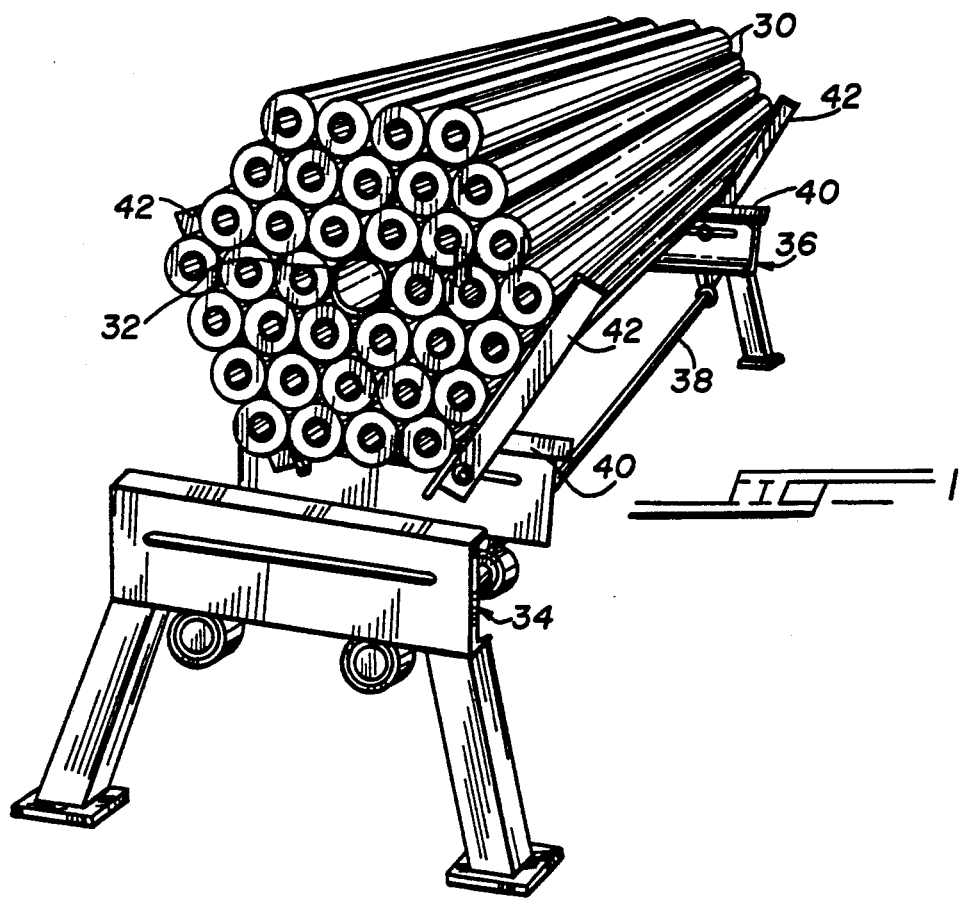
FIG. 1 is a perspective view of a bundle of rolls around a hollow core in accordance with the present invention, together with a temporary support means to hold the rolls in a stable position during assembly and strapping.

It may also be seen that if multiple layers are employed, the outermost layer may be omitted from any side without loss of the stable configuration, for example, omission of the top three rolls from the bundle shown in FIG. 1.

FIG. 1 illustrates a device or jig which may be employed to arrange the rolls 30 and core 32 in a stable bundle. A pair of spaced upright supports may be provided, as generally indicated at 34 and 36, and the supports may be connected by suitable members such as 38. Each support comprises a horizontal surface or beam 40 to support the lowermost layer of rolls. The supports each include a pair of spaced arms 42 extending upwardly from the support beam 40 on an angle to define the outer perimeter of the completed bundle. In the embodiment shown, the beam 40 and the arms 42 define the lower half of a regular hexagon. It may be seen that after the lower layers of rolls are stacked up to the level of the central core, no additional support at the sides is required to complete the stacking of the bundle.

Figure 7:
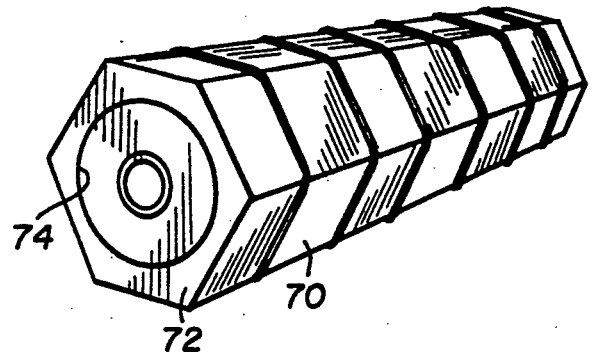
FIG. 7 is a perspective view of the assembled bundle having an outer protective wrapping.

As shown in FIG. 2, the assembled bundle is secured by a plurality of ties or straps 50 extending around the perimeter of the bundle. As shown in FIG. 7, an outer cover 70 composed of cardboard may be disposed around the outside of the bundle to protect the contents. In the embodiment shown, the cover is hexagonal in shape and has hexagonal ends 72 with a central opening therein 74 to allow insertion of a lifting member into the package.

We claim:

1. A transportation package for shipping wound rolls of sheet material, said package comprising a plurality of said rolls and a hollow tube, at least one layer of at least three rolls being disposed around said tube in the form of a bundle, said tube being located centrally within said bundle, adjacent rolls being in tangential contact with each other and with said tube, said tube accommodating insertion of a lifting means to facilitate transportation.

2. The transportation package of claim 1 comprising means for securing said bundle together.

3. The transportation package of claim 1 wherein said one layer comprises six rolls.

4. The package of claim 1 wherein said rolls have substantially the same diameter.

5. The package of claim 1 further comprising a second layer of twelve rolls.

6. The package of claim 1 wherein the geometrical relation between the rolls and central core is set forth below:

$$D_c = D_r \left( \frac{1}{\text{SIN}\left(\frac{\pi}{N}\right) - 1} \right)$$

$D_c$ = the outside diameter of the central support core;
$D_r$ = the outside diameter of the individual rolls; and
$N$ = the number of sides desired for the package.

* * * * *